US011012696B2

(12) United States Patent
Agrawal et al.

(10) Patent No.: US 11,012,696 B2
(45) Date of Patent: May 18, 2021

(54) REDUCING AN AMOUNT OF STORAGE USED TO STORE SURVEILLANCE VIDEOS

(71) Applicant: Dell Products L. P., Round Rock, TX (US)

(72) Inventors: Siddharth Agrawal, Sambalpur (IN); Ashish Kumar Palo, Koraput (IN); Gyanendra Kumar Patro, Berhampur (IN)

(73) Assignee: Dell Products L.P., Round Rock, TX (US)

( * ) Notice: Subject to any disclaimer, the term of this patent is extended or adjusted under 35 U.S.C. 154(b) by 297 days.

(21) Appl. No.: 15/970,012

(22) Filed: May 3, 2018

(65) Prior Publication Data
US 2019/0342556 A1 Nov. 7, 2019

(51) Int. Cl.
| | |
|---|---|
| *G06K 9/00* | (2006.01) |
| *H04N 19/132* | (2014.01) |
| *G06F 3/06* | (2006.01) |
| *G06N 5/04* | (2006.01) |
| *G06N 20/00* | (2019.01) |
| *G06F 16/58* | (2019.01) |

(52) U.S. Cl.
CPC ......... *H04N 19/132* (2014.11); *G06F 3/0608* (2013.01); *G06F 16/58* (2019.01); *G06K 9/00503* (2013.01); *G06N 5/046* (2013.01); *G06N 20/00* (2019.01); *G06K 2209/27* (2013.01)

(58) Field of Classification Search
None
See application file for complete search history.

(56) References Cited

U.S. PATENT DOCUMENTS

| | | | |
|---|---|---|---|
| 2011/0078751 A1* | 3/2011 | Calisa ................ | H04N 21/2407 725/93 |
| 2011/0246621 A1* | 10/2011 | May, Jr. .............. | H04L 65/4084 709/219 |
| 2014/0218608 A1* | 8/2014 | Stelliga ............ | H04N 21/43635 348/441 |
| 2018/0227585 A1* | 8/2018 | Wang ................... | H04N 19/136 |
| 2018/0284735 A1* | 10/2018 | Cella ................... | H04L 67/1097 |

* cited by examiner

*Primary Examiner* — Wei Wen Yang
(74) *Attorney, Agent, or Firm* — Campbell Stephenson LLP; S. Naimpally

(57) ABSTRACT

In some examples, a computing device may receive a request for a video segment captured by a particular camera, where the request specifies a date, a start time, and a length of the video segment. The computing device may identify stored data associated with the video segment in a storage device based on the date, the start time, the length, and an identifier associated with the particular camera and retrieve the stored data from the storage device. The computing device may determine that the stored data includes a subset of the video frames that were sent from the particular camera and excludes a remainder of the video frames and regenerate the remainder of the video frames based on the stored data to create regenerated data. The computing device may reconstruct the reconstructed video segment by merging the stored data with the regenerated data and provide the reconstructed video segment.

13 Claims, 6 Drawing Sheets

REDUCING AN AMOUNT OF STORAGE USED TO STORE SURVEILLANCE VIDEOS

BACKGROUND OF THE INVENTION

Field of the Invention

This invention relates generally to computing devices and, more particularly to reducing an amount of storage used to store data, such as for example, surveillance video data.

Description of the Related Art

As the value and use of information continues to increase, individuals and businesses seek additional ways to process and store information. One option available to users is information handling systems. An information handling system (IHS) generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Security is important in several aspects of life such as security at home as well as at businesses (e.g., enterprises). Office buildings as well as residential homes may use cameras to store several hours of video surveillance. One option includes employing internet protocol (IP) cameras for surveillance, which can send and receive data via a computer network and the Internet, using wired technologies, wireless technologies, or both. The data collections may be centralized and stored in one location or decentralized and stored at storage locations near each camera. In some cases, a business may opt for a centralized storage to hold data from IP cameras. When a business has a large number of IP cameras, the amount of video data that is generated may be large and stored on storage media located on a central server.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some examples, a computing device may receive video segments comprising multiple video frames from a plurality of cameras. To reduce the amount of storage used to store the video segments, the computing device may select and store a subset of the video frames and discard a remainder of the video frames. After the subset of video frames has been stored, the computing device may receive a request for a video segment captured by a particular camera of the plurality of cameras. The request may specify the particular camera, a date, a start time, and length of the video segment. The computing device may identify the stored data associated with the video segment in a storage device based on the date, the start time, the length, and an identifier associated with the particular camera and retrieve the stored data from the storage device. The computing device may determine that the stored data includes a subset of the video frames that were sent from the particular camera and exclude the discarded video frames. The computing device may regenerate the discarded video frames based on the stored data to create regenerated data and merge the stored data with the regenerated data to create a reconstructed video segment. The discarded video frames may be regenerated using a machine learning technique, such as, for example, extreme learning machine (ELM). The computing device may provide the reconstructed video segment in response to the request.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

Figure 1:
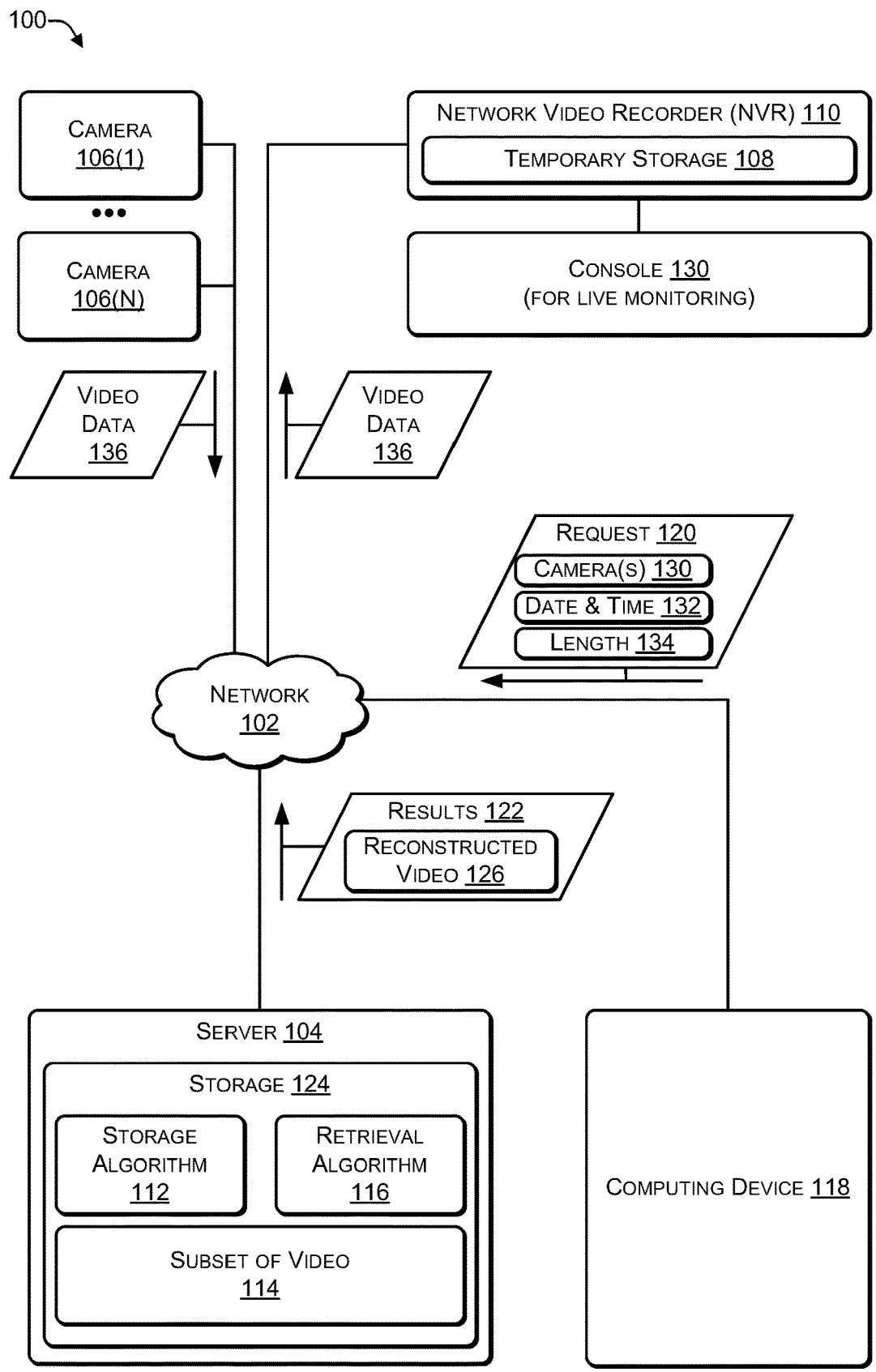
FIG. 1 is a block diagram of a network architecture to store and view video frames produced by security cameras according to some embodiments.

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

Surveillance cameras may produce a large amount of video data. For example, a global organization may have multiple cameras set up at multiple office sites around the world. Let's assume a particular office has about fifty cameras functioning 24 hours, 7 days a week and additionally the particular office wants to store the data for at least 90 days. The estimated amount of storage needed to store 90 days' worth of video data for one camera is 3.12 terabytes (TB). For one office site having fifty cameras, each requiring 3.12 TB of storage space over a span of ninety days, amounts to a large amount of video data.

One or more cameras may be part of a centralized camera storage system or a decentralized camera storage system. The camera storage system captures video data from multiple cameras that are part of the camera storage system, and then stores the data for a period of time. In a decentralized system, the video data may be stored locally on the camera or in one of multiple storage locations. In a centralized system, video data generated by the cameras may be stored in memory on a central server. The systems and techniques described herein may reduce an amount of video data that is stored, for example, in a central server or in multiple storage locations. For example, the video data that is transmitted to the central server may have undergone image compression, using a technique such as, for example, Joint Photographic Experts Group (JPEG) Image Compression, M-JPEG Image Compression, or the like. In some cases, the video data may be further compressed at the central server prior to being stored. The central server may achieve further compression by separating the video data in to video frames and discarding a subset of the video frames while storing the remainder of the video frames. The stored video data may be accessed at a later date, during which time the central server may restore (e.g., reconstruct) the video data before the video is provided to a user that requested to view the video data.

On the central server, the video data may be further compressed by a storage algorithm prior to being stored. For example, given a video segment having six frames the storage algorithm may identify a portion of the six frames to discard. By discarding a portion of the six frames, the storage algorithm may cause less than six frames to be stored in a storage device of the central server. When a user requests to view the video segment, a retrieval algorithm residing in the central server, retrieves the video segment, regenerates the discarded video frames using machine learning, reconstructs the full video segment using the regenerated video frames and transmits the reconstructed video segment to the user.

For example, a security guard may desire to view which individuals entered a particular physical location during a particular time interval. The security guard may use a viewing console to send a request to view a video segment captured by a particular video camera (or set of video cameras) during a particular time for a particular time interval. In response to the request, the central server may retrieve the stored video data, reconstruct the video segment from the stored video data, and display the reconstructed video segment on the viewing console. The security guard may be able to perform various operations on the reconstructed video segment, including starting playback, pausing playback, rewinding, and fast forwarding the reconstructed video segment.

There are several techniques that may be used to decompress a video segment stored in the central server. In one example, the storage algorithm discards even numbered frames, and stores odd numbered frames (e.g., frames 2, 4, and 6 are discarded and frames 1, 3, and 5 are stored). In this example, when a user sends a request to view the six frame video segment, the retrieval algorithm retrieves frames 1, 3, and 5 from storage. The storage algorithm then determines that the odd frames were stored and the even frames were discarded and then proceeds to regenerate frames 2, 4, and 6. Next the retrieval algorithm reconstructs the video segment by merging the regenerated frames (e.g., even frames) with the odd frames to create a reconstructed video segment. Subsequently the reconstructed video segment with all six frames is provided to the requesting device. There is little to no discernable difference between the originally captured video segment and the reconstructed video segment. Thus the compression techniques described herein do not compromise a quality of the video segment.

As a first example, a computing device (e.g., a central server) may include one or more processors and one or more non-transitory computer readable media storing instructions executable by the one or more processors to perform various operations. The computing device receives a video segment from a particular camera of a plurality of cameras. The particular camera may be part of a centralized surveillance system including several cameras that generate video data and sent it to a central facility. To reduce the amount of space used to store the video data, a storage algorithm may identify which frames to keep (e.g., store) and which frames to discard. Thus the computing device, selects a subset of the video frames to store (e.g., a storage algorithm discards even numbered video frames and stores odd numbered frames).

When a user (e.g., security guard) requests to view a video segment the user sends a request. Accordingly, the computing device may receive a request for a video segment captured by the particular camera of the plurality of cameras. The request specifies the particular camera, a date, a start time, and a length of the video segment (or an end time).

The computing device may identify, based on the date, the start time, the length, and the specified camera, stored data that is associated with the video segment and stored in a storage device. The computing device may retrieve the stored data from the storage device and determine that the stored data includes a subset of the video frames that were sent from the particular camera and excludes a remainder of the video frames. For example, after the computing device retrieves the stored data, the computing device may determine that odd numbered frames are present while even numbered frames are missing in the stored data. Given the example with six frames in the video segment, the retrieval algorithm may determine that frames 2, 4, and 6 are missing, which are the remainder of the video frames. The remainder of the video frames may represent video frames that were previously discarded by a storage algorithm processing video data received from the specified camera.

The computing device may regenerate the discarded video frames based on the stored data to create regenerated video frames. For example, the computing device may apply a machine learning algorithm, such as an extreme learning machine (ELM) algorithm Extreme learning machines are feedforward neural networks that use a single layer or multiple layers of hidden nodes, where the parameters of hidden nodes (in addition to the weights connecting inputs to hidden nodes) may not be tuned. The hidden nodes can be randomly assigned and may not be updated (i.e., they may be random projections but with nonlinear transforms), or can be inherited from ancestors without being changed. Often, the output weights of hidden nodes are learned in a single step, which may amount to learning a linear model. For example, when the remainder of the video frames that are being regenerated include even numbered frames, the machine learning algorithm may use the odd numbered frames retrieved from storage to regenerate the even numbered frames.

The computing device may reconstruct a video segment by merging the stored data (e.g., that was retrieved from storage) with the regenerated data to reconstruct the requested video segment. For example, the computing device may merge frames 1, 3, and 5 (retrieved from storage) with frames 2, 4, and 6 (regenerated by machine learning algorithm) to create a reconstructed video segment. The computing device provides the reconstructed video segment (e.g., to a user that requested to view the video segment).

FIG. 1 is a block diagram illustrating part of a system 100 that includes one or more cameras 106(1), ..., 106(N) that generate video data 136 that is transmitted as video frames through system 100. For example, system 100 may be a system that uses equipment, such as multiple video cameras, to transmit video signals to a specific storage location for storage and subsequent viewing. One or more cameras 106(1), ..., 106(N) may include surveillance cameras set up at a place of business, a home, or the like. The one or more cameras 106(1), ..., 106(N) (e.g. surveillance cameras) may capture video data during several hours in a day (e.g., during business hours, twenty four hours, etc.). The one or more cameras 106(1), ..., 106(N) may generate a large quantity of video data that is subsequently stored in temporary storage 108 and in turn, on server 104. For example, a system 100 may represent the surveillance system set up at a global organization that has dozens of office sites in a city, in a state, in a country, or around the world. Assume each office site has fifty cameras running for twenty four hours, every day. Some office sites may store video data for about 90 days (3 months) before being discarded. Over the course of three months, a single camera may capture video data averaging around 3.12 terabytes (TB) (estimated). For a site that includes fifty cameras, per site, over the course of three months, around 156 TB of video data may be generated.

Thus, the system 100 may generate a massive amount of data that may need to be stored for subsequent retrieval and viewing. The system 100 includes a network 102 that communicatively couples various devices, including server 104, computing device 118, network video recorder 110, and cameras 106(1), ..., 106(N). Network 102 may include local area network (LAN) and wide area networks (WAN). The network 102 may include wired technologies (e.g., Ethernet®) and wireless technologies (e.g., WiFi®, code division multiple access (CDMA), global system for mobile (GSM), universal mobile telephone service (UMTS), Bluetooth®, ZigBee®, and the like). For example, some of the cameras 106 may use a wired connection to transmit the video data 136 over the network 102 while others of the cameras 106 may use a wireless technology (e.g., WiFi® or the like) to transmit the video data 136 over the network 102.

One or more cameras 106(1), ..., 106(N) may capture video data, and transmit the video data 136 to a server 104, a network video recorder (NVR) 110, or both. The location to which the one or more cameras 106(1), ..., 106(N) transmits the video frames 128 may vary based on how system 100 is configured. For example, system 100 may be configured such that one or more cameras 106(1), ..., 106(N) are set up to record and store video data 136 locally on the camera or on a remote storage media. In another example, system 100 may be configured to be more centralized, where a central NVR 110 handles recording, video data storage and alarm management. Video data 136 may also contain metadata identifying its source (e.g., camera) by an identifier that is associated with the particular camera transmitting the video data.

NVR 110 may include a device with an embedded operating system. For example, NVR 110 may include desktop computing devices, laptop computing devices, tablet computing devices, and the like. NVR 110 may include a software program that records video in a digital format to a memory such as temporary storage 108 (e.g., disk drive, solid state disk drive, USB flash drive, SD memory card, or any type of non-transitory media capable of storing computer-readable instructions). In some embodiments, video data 136 are processed at one or more cameras 106(1), ..., 106(N) and then streamed to NVR 110 for storage or remote viewing. Additional processing may occur at NVR 110, for example further compression or tagging with metadata. In one example, NVR 110 is used in an internet protocol (IP) video surveillance system.

NVR 110 may be communicatively coupled to console 130. The console 130 may display video as it is streamed to NVR 110 from one or more cameras 106(1), ..., 106(N) and thus may be used for live monitoring purposes. Console 130 may be a screen that is combined into a single device with NVR 110.

In another example, video data captured by one or more cameras 106(1), ..., 106(N) may be transmitted to a server 104 (e.g., video data 136). In some examples, the video data 136 may be transmitted to the server 104 in a compressed format (e.g., JPEG Image Compression, M-JPEG Image Compression, Moving Picture Experts Group (MPEG) 1, 2, 4 (Part 2), H.264 or MPEG 4, etc.). The server 104 may include storage 124 (e.g., disk drive, solid state disk drive, or any type of non-transitory media capable of storing computer-readable instructions). Storage 124 may store various applications, an operating system, and data. For example, storage 124 may store algorithms such as storage algorithm 112, and retrieval algorithm 116, and data such as subset of video 114.

Server 104 may receive video data 136 and storage algorithm 112 may further process the video data 136 to further compress the video. In one example, storage algorithm 112 sorts video data 136 into individual video frames (e.g., identifies and assigns an identifier to individual frames), makes determinations that result in discarding some video frames, and stores the remainder of the video frames as subset of video 114. In one example, storage algorithm 112 may identify video frames in video data 136 by receiving the video file (e.g., video data 136), determining the number of frames in the video file, reading and converting each frame to an image file, naming and numbering each image file, and then writing the image file to a file folder. The video frames may be numbered in succession (e.g., 1, 2, 3, ..., x). Storage algorithm 112 may split the video into even and odd numbered frames, discard the even numbered frames, and store the odd numbered frames (e.g., frames numbered 1, 3, 5, ..., x are stored in storage 124 as subset video 114).

In the example, where even-numbered frames are discarded, the amount of video data is reduced by at least half. For example, if one or more cameras 106(1), ..., 106(N) transmits video data 136 that is one gigabyte (GB), the odd numbered frames would make up about 500 megabytes (MB) of video data and the even numbered frames would make up about 500 MB. The storage algorithm 112 discards the even numbered frames and stores the odd numbered frames, thus storing about 500 MB of data instead of one GB. Thus, a compression rate of 50% may be achieved in this example, where the compression is achieved without compromising the quality of the original video.

The method used to split and sort video data 136 into video frames where a subset is stored, is not limited to the example given above. Other methods may also be implemented by storage algorithm 112. For example, another method may include comparing frames that occur within a predetermined time period of each other. Storage algorithm 112 may discard frames that are similar (or identical) to each other. Similar frames may be defined as frames that differ from each other by less than a predetermined amount. For example, as between two frames, a computing device may perform a pixel by pixel comparison for the two frames. The two frames are determined to be similar if the number of pixels that differ between the two is less than P, where P is greater than zero.

Alternatively, storage algorithm 112 may compare frames as they are received and discard identical frames to further reduce storage needs. For example, between midnight and 6:00 am there may be very little changes in the frames received. Thus, storage algorithm 112 may store a single frame (e.g., subset of video 114) for the time period from midnight to 6:00 AM. Alternately, there may be a minimal amount of change in the frames received between midnight and 6:00 AM, resulting in significantly less than 50% of the frames being stored. For example, from the hours of midnight to 6:00 AM, a security guard may walk through. The storage algorithm may store the few seconds worth of frames capturing the security passing in front of the camera. Thus, for example, 5%, 10%, 15%, 20%, 25%, or another percentage of the frames may be stored for the time period from midnight to 6:00 AM.

After storage algorithm 112 stores subset of video 114 in storage 124, the subset of video 114 may be retrieved later for subsequent viewing. For example, if a security incident is detected, a security guard may desire to view a video segment that was previously captured by one or more of the video cameras. Through computing device 118 (e.g., desktop computer, tablet, laptop, etc.), a user may request to view a video segment that is stored as subset of video 114. In various embodiments, the computing device 118 transmits a request 120 through network 102. Request 120 includes data that may be used to identify a particular video segment. For example, the request 120 may include one or more identifiers for one or more camera(s) 130, date and time 132, and length 134. In some cases, instead of a length, a start time and stop time may be specified. That is, the one or more identifiers for one or more camera(s) 130 may contain information that identify which of the one or more camera(s) 106(1), . . . , 106(N) captured the video segment. The identifier may be included as metadata of video data 136. The date and time 132 information identify the date and time the video segment was captured. Similarly, date and time information may also be included as metadata of video data 136. Length 134 identifies the duration of the video segment starting at the time specified by date and time 132.

As described previously, storage algorithm 112 processes the original video segment for a given a specific request 120. Thus, storage algorithm 112, stores less than the original number of video frames as subset of video 114. Prior to displaying the video segment associated with request 120, retrieval algorithm 116 reconstructs the video. Retrieval algorithm 116 may retrieve the video segment identified in request 120, based on the date and time 132, length 134, and an identifier associated with the particular camera specified by camera(s) 130.

Retrieval algorithm 116 regenerates the video frames that were discarded by storage algorithm 112, merges the regenerated video frames with the video frames stored as subset of video 114 to create a reconstructed video 126. Retrieval algorithm 116 may regenerate the missing video frames using the stored video frames. For example, in the previously discussed example where the odd numbered frames were stored and even numbered frames were discarded, retrieval algorithm 116 may regenerate even numbered frames based on the odd numbered frames.

Retrieval algorithm 116 may use a machine learning algorithm to regenerate the missing video frames. Any type of machine learning model may be used that is able to progressively improve performance on a specific task with data, without being explicitly programmed and to produce good generalization performance (e.g., clustering, dimensionality reduction, structured prediction, anomaly detection, neural nets, reinforcement learning, etc.). In some cases, the machine learning model may be based on extreme learning machine (ELM).

ELM are feedforward neural networks that use a single layer or multiple layers of hidden nodes, where the parameters of hidden nodes (in addition to the weights connecting inputs to hidden nodes) may not be tuned. The hidden nods can be randomly assigned and may not be updated (i.e., they may be random projections but with nonlinear transforms), or can be inherited from ancestors without being changed. Often, the output weights of hidden nodes are learned in a single step, which may amount to learning a linear model.

In one example, retrieval algorithm 116 may apply an extreme learning machine algorithm. The structure of an extreme learning algorithm may include a bias parameter (e.g., b), a given set of parameters (e.g., x (1), . . . , x (d)), one of more layers of hidden nodes (e.g., hidden node 1, . . . , hidden node L), and an output (e.g., y). The output y with hidden L nodes may be represented by:

$$y = \sum_{i=1}^{L} \beta_i g_i(x) = \sum_{i=1}^{L} \beta_i G(\omega_i, b_i, x) = H\beta \quad (1)$$

where X, $\omega_i \in R^d$ and $g_i$ denotes the $i^{th}$ hidden node output function G ($\omega$i, bi, x). H and $\beta$ are the hidden layer output matrix and output weight matrix respectively. An activation function such as Radial Basis Function (RBF) may be used. For N distinct samples $(x_j, t_j)$, j=1 . . . N, equation (1) may be written as:

$$H\beta = T \quad (2)$$

where $$H = \begin{bmatrix} G(\omega_1, b_1, x_1) & \ldots & G(\omega_L, b_L, x_1) \\ \vdots & \vdots & \vdots \\ G(\omega_1, b_1, x_N) & \ldots & G(\omega_L, b_L, x_N) \end{bmatrix} \quad (3)$$

$$\beta = \begin{bmatrix} \beta_1 \\ \vdots \\ \beta_L \end{bmatrix}_{L \times 1} \text{ and } T = \begin{bmatrix} t_1 \\ \vdots \\ t_N \end{bmatrix}_{N \times 1} \quad (4)$$

where T is the target matrix. Input weights of its hidden neurons ($\omega$i, bi) may be randomly generated instead of tuned, and output weight matrix β may be calculated through Least Squares Estimate (LSE).

$$\beta = H^{\dagger}T \qquad (5)$$

where $H^{\dagger}$ is the Moore-Penrose generalized inverse of matrix H, which can be calculated through orthogonal projection, where $H^{\dagger}=(H^T H)^{-1} H^T$.

The process of an extreme learning algorithm may randomly generate hidden neuron parameters (ωi, bi), calculate a hidden layer matrix H (equation 3), and calculate the output weight β (equation 5).

Several methods and techniques may be utilized to generate training datasets and to optimize the machine learning algorithm. For example, to optimize the extreme learning algorithm, video segments recorded from at least N different cameras such as cameras 106(1), . . . , 106(N), from a particular day or any random day may be taken as a training data set. In some cases, the video data produced by a minimum number of cameras, such as 10 cameras (e.g., N>=10), may be used. Each individual video may be divided into frames with odd frames given as inputs to the extreme learning algorithm, where the output obtained with compared with the desired output (even frames). Then the difference between their values is used to optimize the algorithm.

In some examples, the task of regenerating the frames may achieve a peak signal to noise ratio (PSNR) of around 43. Generally, 30 may be considered an acceptable PSNR in video compression, thus a quality of the video is not degraded due to the compression techniques that may be applied by server 104. In some examples, retrieval algorithm 116 takes about 1.5 minutes to reconstruct 30 minutes of video (e.g., 1 minute of video takes 3 seconds to reconstruct). Because the system is locating and then retrieving a particular video segment from 90 days (e.g., terabytes) of video data from multiple cameras, the user is expecting that the retrieval will take a particular amount of time (e.g., several minutes). The time taken to reconstruct the video incrementally adds to the retrieval time and will typically not adversely impact the user since the user is not expecting the retrieval to take place substantially in real time. Thus, when computing device 118 receives request 120, reconstructing the video segment does not significantly add to the time to locate and retrieve the requested video segment.

Once retrieval algorithm 116 regenerates the missing frames associated with the video segment requested by request 120, server 104 sends results 122 including the reconstructed video 126 through network 102 to computing device 118 or NVR 110. Alternatively, result 122 may be displayed on a monitor coupled to server 104.

While the examples herein describe storing odd numbered frames and discarding even numbered frames, other similar techniques may be used to reduce the storage usage by video generated from multiple security cameras. For example, in some cases, odd numbered frames may be discarded and even numbered frames may be stored. As yet another example, every Pth (where P>1) numbered frame may be stored and the remaining frames discarded. As a further example, during time periods (e.g., midnight to 6:00 AM) where many people are not expected to pass by the security cameras, the storage algorithm may compare adjacent frames (or frames occurring within a particular time interval) and discard those frames that differ from the first frame by less than a predetermined amount. For example, if a first frame and a second frame differ by less than X number of pixels (where X>0), then the second frame may be discarded. Thus, in this example, between midnight to 6:00 AM, significantly greater than 50% (e.g., 80% or 90%) of the frames may be discarded, thereby further reducing storage usage.

Thus, in a security camera network, multiple cameras may send video data to a central server for storage and subsequent retrieval. The video data may be sent in a format based on an MPEG-based (or similar) compression scheme, such as MPEG4, H.264, or the like. Because multiple video streams from multiple cameras can generate terabytes of data, a storage algorithm may further compress the video data before storage. A retrieval algorithm may reconstruct the video data during the retrieval process. For example, in some cases, odd numbered frames may be stored and the even numbered frames may be discarded, thereby reducing storage usage by 50%. The business or residential customer that has deployed the security camera network can use the 50% reduction in storage in several ways. First, the business or residential customer may store video for a longer period of time, e.g., 6 months rather than 3 months. Second, the business or residential customer may use a smaller storage device, thereby saving on the cost of purchasing a large storage device. Third, the business or residential customer may deploy additional cameras without having to purchase additional storage capacity. For example, as a business grows, the business may add more security cameras to the network without having to increase the storage capacity of the central storage device.

When a user requests retrieval of a particular video segment by specifying a camera (or set of cameras), a date, a start time, and a length (or an end time), the retrieval algorithm may identify and retrieve video data associated with the video segment. For example, the retrieval algorithm may identify the odd frames from the requested video segment that were stored in the storage device. The discarded frames (e.g., the even frames) may be regenerated using a machine learning technique, such as extreme learning machine. The regenerated (e.g., even) frames may be combined with the retrieved (e.g., odd) frames to create a reconstructed video segment that is provided to the requesting device. The user that requested the particular video segment may view the reconstructed video segment.

Figure 2:
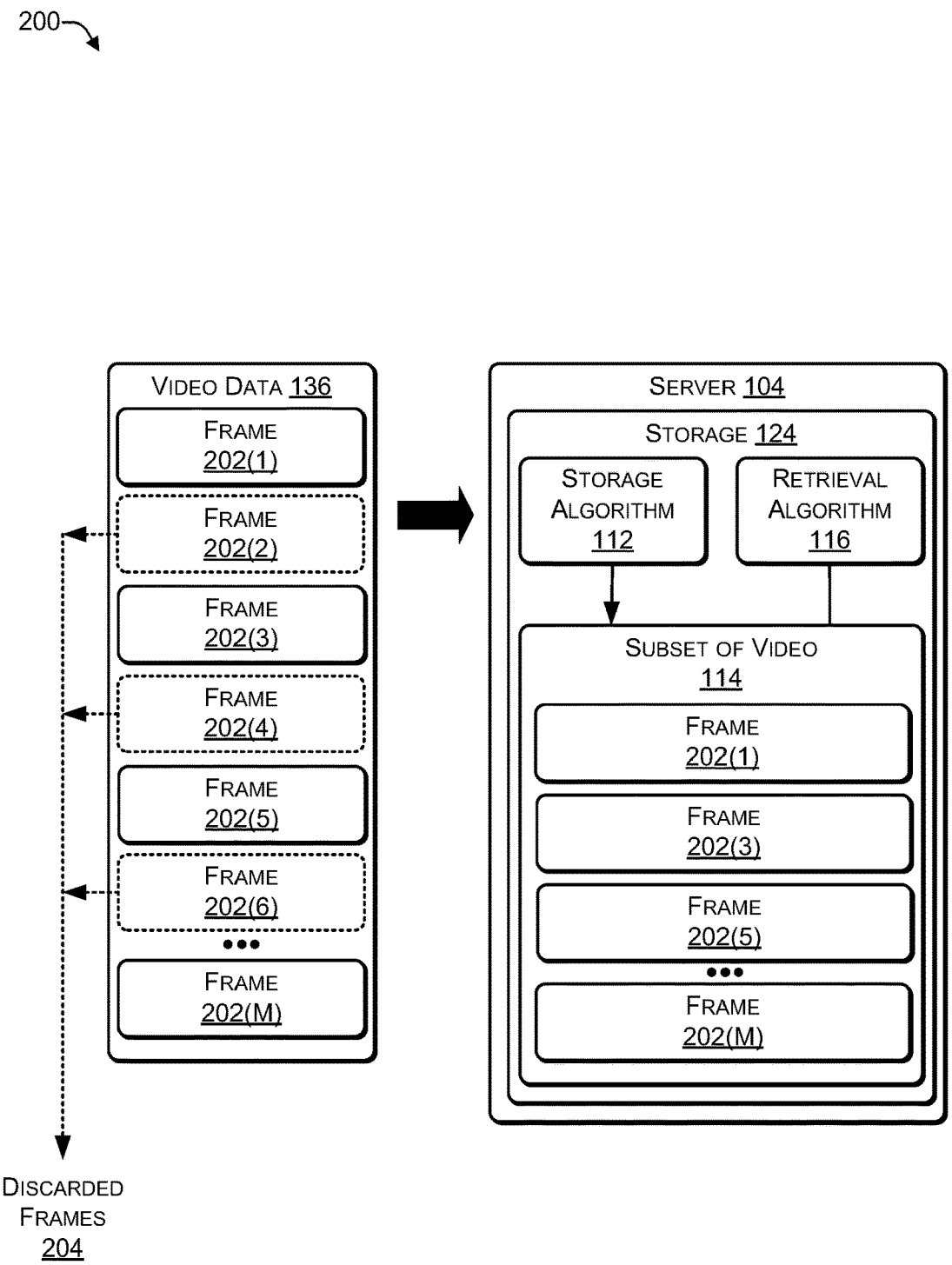
FIG. 2 is a block diagram illustrating a storage algorithm to store video frames according to some embodiments.

FIG. 2 is a block diagram 200 illustrating some operations of storage algorithm 112. Storage algorithm 112 receives video data 136 and sorts the video data 136 into frames 202(1), 202(2), . . . , 202(M). As discussed in FIG. 1, storage algorithm 112 may use various method for determining which video frames to discard. In one example, as illustrated in FIG. 2, the even-numbered frames (e.g., 202(2), 202(4), . . . , 202(6), etc.) may be discarded as discarded frames 204. The remaining frames (odd numbered frames 202(1), . . . , 202(3), . . . , 202(5), etc.) may be stored in storage 124 as subset of video 114. Storage algorithm 112 may use other methods to process video data 136, in addition to the example of discarding odd numbered frames and discarding even numbered frames.

Continuing the previous example, of the remaining video frames (even-numbered frames) storage algorithm 112 may compare adjacent frames (e.g., compare frame 202(1) to frame 202(3), and compare frame 202(3) to frame 202(5)) to determine if additional frames may be discarded. For example, if frame 202(3) is the same as frame 202(5), frame 202(5) may be discarded. Next frame 202(3) may be compared to frame 202(7). Various metrics may be used to determine if a frame is similar enough to another frame during the determination to discard frames. For example a first frame and a second frame may be determined to be similar if the frames differ by less than X number of pixels (where X>0).

In another example, frames within a predetermined amount of time within each other may be assessed to determine which frames will be discarded by algorithm 112. For example, a predetermined amount of time may be 3 seconds. In this example, frames 202(1), 202(2), and 202(3) may be within 3 seconds of each other. Storage algorithm 112 may compare the earlier occurring frames to the later occurring frames. Thus frame 202(1) may be compared to frame 202(2) and then frame 202(3). If 202(2) is assessed as being similar to frame 202(1), then frame 202(2) is discarded. In this example, if frame 202(3) is assessed as being different from frame 202(1), then frame 202(3) may be compared to the next frames occurring within three seconds after frame 202(3).

Thus, in security camera network, multiple cameras may send video data to a central server for storage. The video data may be sent in a format based on an MPEG-based (or similar compression scheme, such as MPEG4, H.264, or the like). Because multiple video streams from multiple cameras can generate terabytes of data, a storage algorithm may further compress the video data before storage. For example, in some cases, odd numbered frames may be stored and the even numbered frames may be discarded, thereby reducing storage usage by 50%.

The business or residential customer that has deployed the security camera network can use the 50% reduction in storage in several ways. First, the business or residential customer may store video for a longer period of time, e.g., 6 months rather than 3 months. Second, the business or residential customer may use a smaller storage device, thereby saving on the cost of purchasing large storage device. Third, the business or residential customer may deploy additional cameras without having to purchase additional storage capacity. For example, as a business grows, the business may add more security cameras to the network without having to increase the storage capacity of the central storage device.

Figure 3:
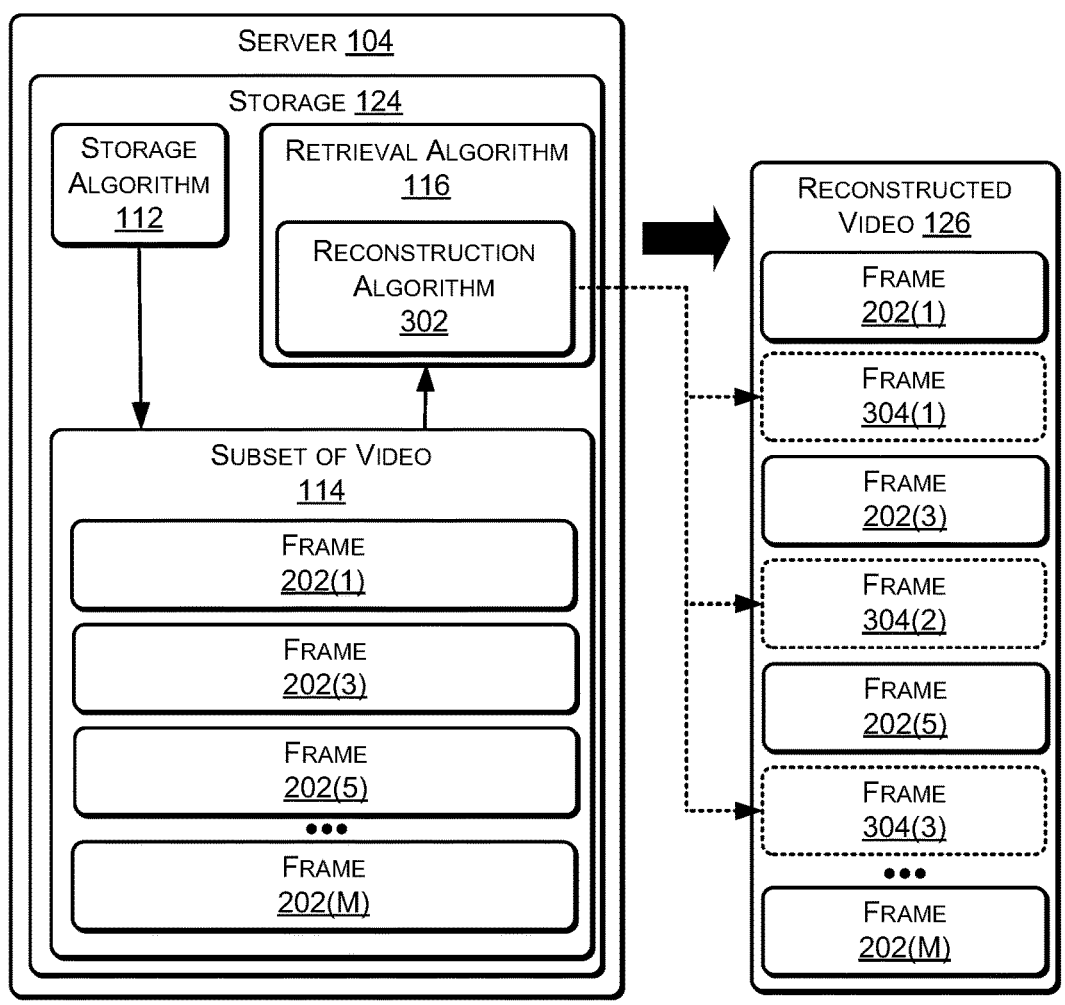
FIG. 3 is a block diagram illustrating a retrieval algorithm to retrieve video frames and regenerate discarded video frames according to some embodiments.

FIG. 3 is a block diagram 300 illustrating some operations of retrieval algorithm 116. Recall retrieval algorithm 116 is responsible for providing a reconstructed video 126 in response to request 120 requesting a video segment for a particular day and time. Request 120 may specify a camera (or set of cameras), a date, a start time, and a length (or an end time). As the video is stored in storage 124 with missing frames as subset of video 114, retrieval algorithm 116 may regenerate the missing frames using reconstruction algorithm 302. Reconstruction algorithm may be any machine learning algorithm such as an extreme learning algorithm. FIG. 3 continues the example from FIG. 2 in which even number frames are stored and odd numbered frames are discarded.

Subset of video 114 includes frames 202(1), 202(3), 202(5), . . . , 202(M) of the video data 136. Prior to storing subset of video 114, storage algorithm 112 discarded frames 202(2), 202(4), 202(6), etc. Accordingly, these previously discarded frames are regenerated by retrieval algorithm 116. For example, the discarded frames are generated based on the frames stored in subset of video 114. For example, reconstruction algorithm 302 may generate frame 304(1) based on the video data in frames 202(1) and 202(3). Additionally, frame 304(2) may be generated based on the video data in frame 202(3) and 202(5). Accordingly, the previously discarded even numbered frames are regenerated based on the odd numbered frames saved in storage 124 to create regenerated frames 304.

Reconstruction algorithm 302 may place the regenerated frames (e.g., 304(1), 304(2), 304(3), etc.) in positions according to the original frames they are replacing. For example, frame 304(1), which replaces previously discarded frame 202(2) (illustrated in FIG. 2), is placed between frame 202(1) and 202(3), where discarded frame 202(2) was positioned in video data 136.

Thus, in a security camera network, multiple cameras may send video data to a central server for storage and subsequent retrieval. The video data may be sent in a format based on an MPEG-based (or similar compression scheme), such as MPEG4, H.264, or the like. Because multiple video streams from multiple cameras can generate terabytes of data, a storage algorithm may further compress the video data before storage. A retrieval algorithm may reconstruct the video data during the retrieval process.

When a user requests retrieval of a particular video segment by specifying a camera (or set of cameras), a date, a start time, and a length (or an end time), the retrieval algorithm may identify and retrieve video data associated with the video segment. For example, the retrieval algorithm may identify the odd frames from the requested video segment that were stored in the storage device. The discarded frames (e.g., the even frames) may be regenerated using a machine learning technique, such as extreme learning machine. The regenerated (e.g., even numbered) frames may be combined with the retrieved (e.g., odd numbered) frames to create a reconstructed video segment that is provided to the requesting device. The user that requested the particular video segment may view the reconstructed video segment.

The techniques discussed herein for compressing the video further at the central server may accomplish compression rates of 50%. For example, in some cases, odd numbered frames may be stored and even numbered frames may be discarded, thereby reducing storage usage by 50%. The business or residential customer that has deployed the security camera network can use the 50% reduction in storage in several ways. First, the business or residential customer may store video for a longer period of time, e.g., 6 months rather than 3 months. Second, the business or residential customer may use a smaller storage device, thereby saving on the cost of purchasing a large storage device. Third, the business or residential customer may deploy additional cameras without having to purchase additional storage capacity. For example, as a business grows, the business may add more security cameras to the network without having to increase the storage capacity of the central storage device.

Figure 4:
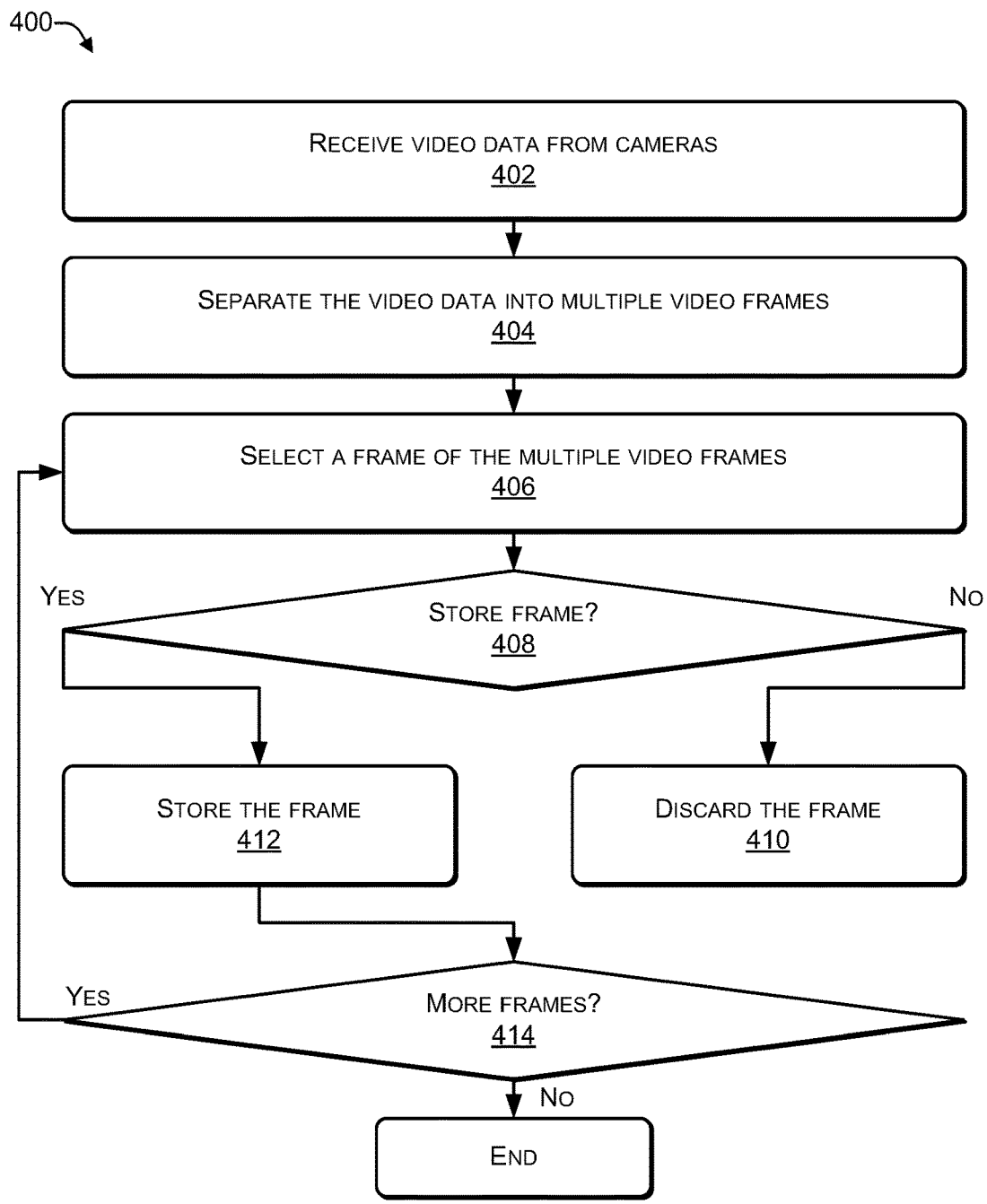
FIG. 4 is a flowchart of a process that includes receiving video data and reducing the number of frames being stored according to some embodiments.

FIG. 4 is a flowchart of a process 400 that includes receiving and storing video data. The process 400 may be performed by a processor on server 104. At 402, video data is received from cameras, such as cameras 106(1), . . . , 106(N) in FIG. 1. At 404, the video data is separated into multiple video frames. For example, in FIG. 2, the storage algorithm 112 separates the video data into video frames that are numbered sequentially.

At 406, a frame of the multiple video frames is selected and at 408, a decision is made as to whether the frame will be stored. For example, in FIG. 2, the storage algorithm 112 may determine to store odd numbered frames and discard even numbered frames. If a determination is made at 408 that the frame will be discarded, then at block 410, the frame is discarded. Alternatively, if a decision is made at 408 that the frame will be stored, at block 412 the frame is stored. For example, in FIG. 2, storage algorithm 112 may process frames sequentially. Thus, it may begin with frame 202(1) and decide to store that frame in storage 124. Storage algorithm 112 may process frame 202(3) and decide to discard that frame, etc.

Next at decision block 414, a determination is made whether there are more frames to assess. After processing a frame, storage algorithm 112 checks to see if more frames remain to be processed. Continuing the above example, after processing frame 202(3), storage algorithm 112 determines more frames remain to be processed (e.g., frames 202(4), 202(5), 202(6), . . . 202(M). If the determination is made that more frames remain to be assessed, the flow proceeds back to block 406. Accordingly, after processing frame 202(3), storage algorithm 112 processes frame 202(4). If the determination is made the no more frames remain to be assess, then the flow ends. For example, when storage algorithm 112 processes frame 202(M), the flow would end. This flow is one example of the process that may be implemented by storage algorithm 112.

Thus, in security camera network, multiple cameras may send video data to a central server for storage. The video data may be sent in a format based on an MPEG-based (or similar compression scheme, such as MPEG4, H.264, or the like. Because multiple video streams from multiple cameras can generate terabytes of data, a storage algorithm may further compress the video data before storage. For example, in some cases, odd numbered frames may be stored and the even numbered frames may be discarded, thereby reducing storage usage by 50%.

The business or residential customer that has deployed the security camera network can use the 50% reduction in storage in several ways. First, the business or residential customer may store video for a longer period of time, e.g., 6 months rather than 3 months. Second, the business or residential customer may use a smaller storage device, thereby saving on the cost of purchasing large storage device. Third, the business or residential customer may deploy additional cameras without having to purchase additional storage capacity. For example, as a business grows, the business may add more security cameras to the network without having to increase the storage capacity of the central storage device.

Figure 5:
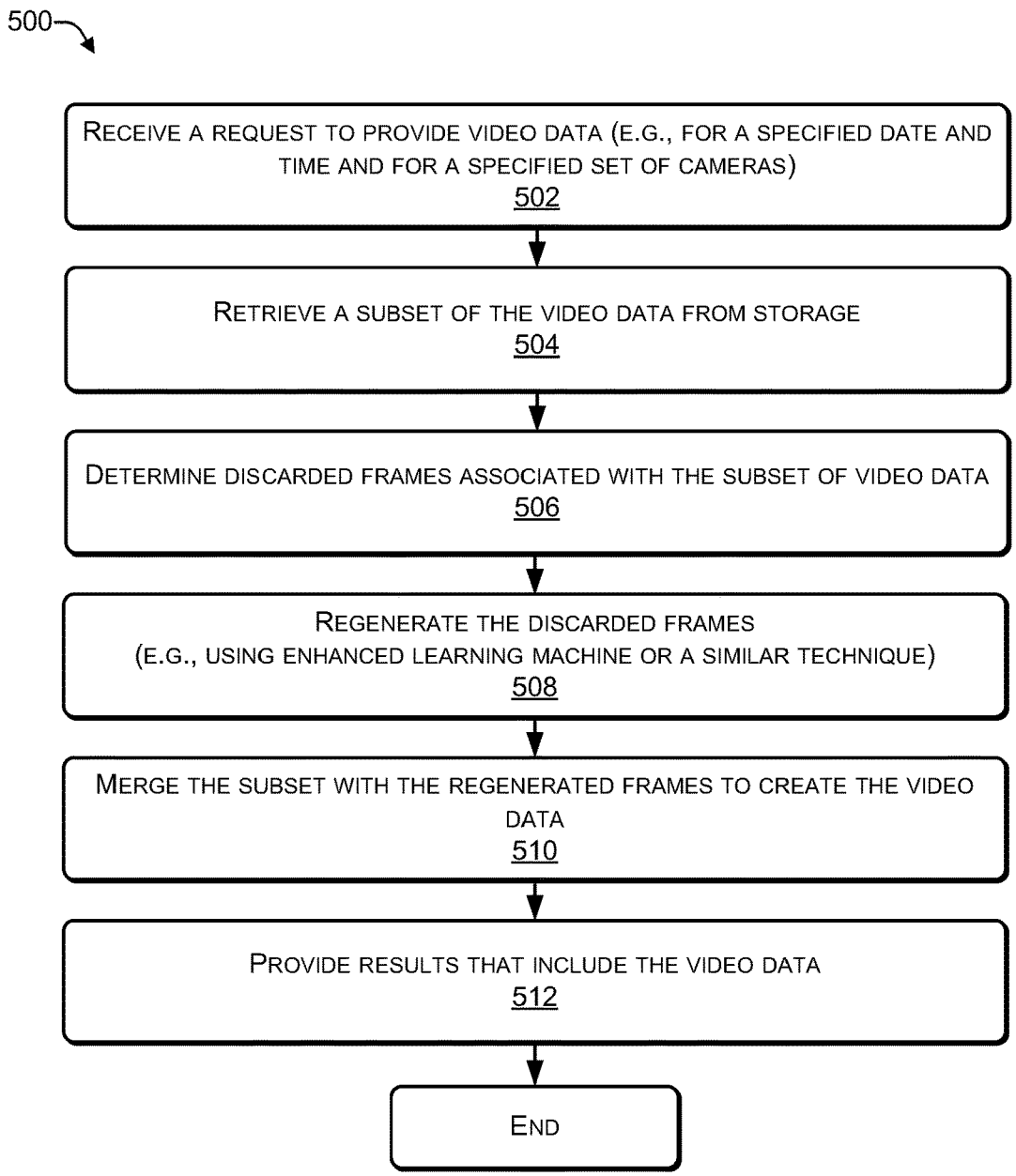
FIG. 5 is a flowchart of a process that includes reconstructing requested video data according to some embodiments.

FIG. 5 is a flowchart of a process 500 that includes regenerating a video segment. The process 500 may be performed by a processor on server 104. At 502, a request is received to provide video data (e.g. for a specified date and time and for a specified set of cameras). This request may be received, for example, from computing device 118 as discussed in FIG. 1.

At 504, a subset of the video data is retrieved from storage. The video data that is retrieved is associated with the video data that is specified in the request at block 500. That is, the video segment that is retrieved may be associated with the specified date and time and further may be associated with a specified one or more cameras. The subset of video data may be retrieved from storage 124 (stored as subset of video 114).

At block 506, a determination is made by retrieval algorithm 116, as to which frames were discarded previously by storage algorithm 112. For example, in FIG. 3, retrieval algorithm 116 determines that even numbered frames are missing. Thus, retrieval algorithm 116 determines that even numbered frames need to be regenerated.

At block 508, an algorithm such as retrieval algorithm 116 or more specifically the reconstruction algorithm 302, may reconstruct the discarded frames. For example, the discarded frames may be reconstructed using enhanced learning algorithms or a similar technique. The discarded frames may be reconstructed using the odd numbered frames. In FIG. 3, reconstruction algorithm 302 regenerates even numbered frames as frames 304(1), 304(2), and 304(3), etc. Reconstruction algorithm 302 regenerates frames 304(1), 304(2), 304(3), etc. based on frames 202(1), 202(3), 202(5), . . . 202(M).

At block 510, an algorithm such as retrieval algorithm 116 or more specifically the reconstruction algorithm 302, may merge the subset retrieved from storage with the regenerated frames to create reconstructed video data. For example, in FIG. 3, reconstruction algorithm 302, creates reconstructed video 126. At block 512, the results are provided which include the video data including the reconstructed video data. The flow ends after block 512. For example, after retrieval algorithm 116 provides the reconstructed video 126, the flow ends.

Thus, in a security camera network, multiple cameras may send video data to a central server for storage and subsequent retrieval. The video data may be sent in a format based on an MPEG-based (or similar compression scheme), such as MPEG4, H.264, or the like. Because multiple video streams from multiple cameras can generate terabytes of data, a storage algorithm may further compress the video data before storage. A retrieval algorithm may reconstruct the video data during the retrieval process.

When a user requests retrieval of a particular video segment by specifying a camera (or set of cameras), a date, a start time, and a length (or an end time), the retrieval algorithm may identify and retrieve video data associated with the video segment. For example, the retrieval algorithm may identify the odd frames from the requested video segment that were stored in the storage device. The discarded frames (e.g., the even frames) may be regenerated using a machine learning technique, such as extreme learning machine. The regenerated (e.g., even numbered) frames may be combined with the retrieved (e.g., odd numbered) frames to create a reconstructed video segment that is provided to the requesting device. The user that requested the particular video segment may view the reconstructed video segment.

The techniques discussed herein for compressing the video further at the central server may accomplish compression rates of 50%. For example, in some cases, odd numbered frames may be stored and even numbered frames may be discarded, thereby reducing storage usage by 50%. The business or residential customer that has deployed the security camera network can use the 50% reduction in storage in several ways. First, the business or residential customer may store video for a longer period of time, e.g., 6 months rather than 3 months. Second, the business or residential customer may use a smaller storage device, thereby saving on the cost of purchasing a large storage device. Third, the business or residential customer may deploy additional cameras without having to purchase additional storage capacity. For example, as a business grows, the business may add more security cameras to the network without having to increase the storage capacity of the central storage device.

Figure 6:
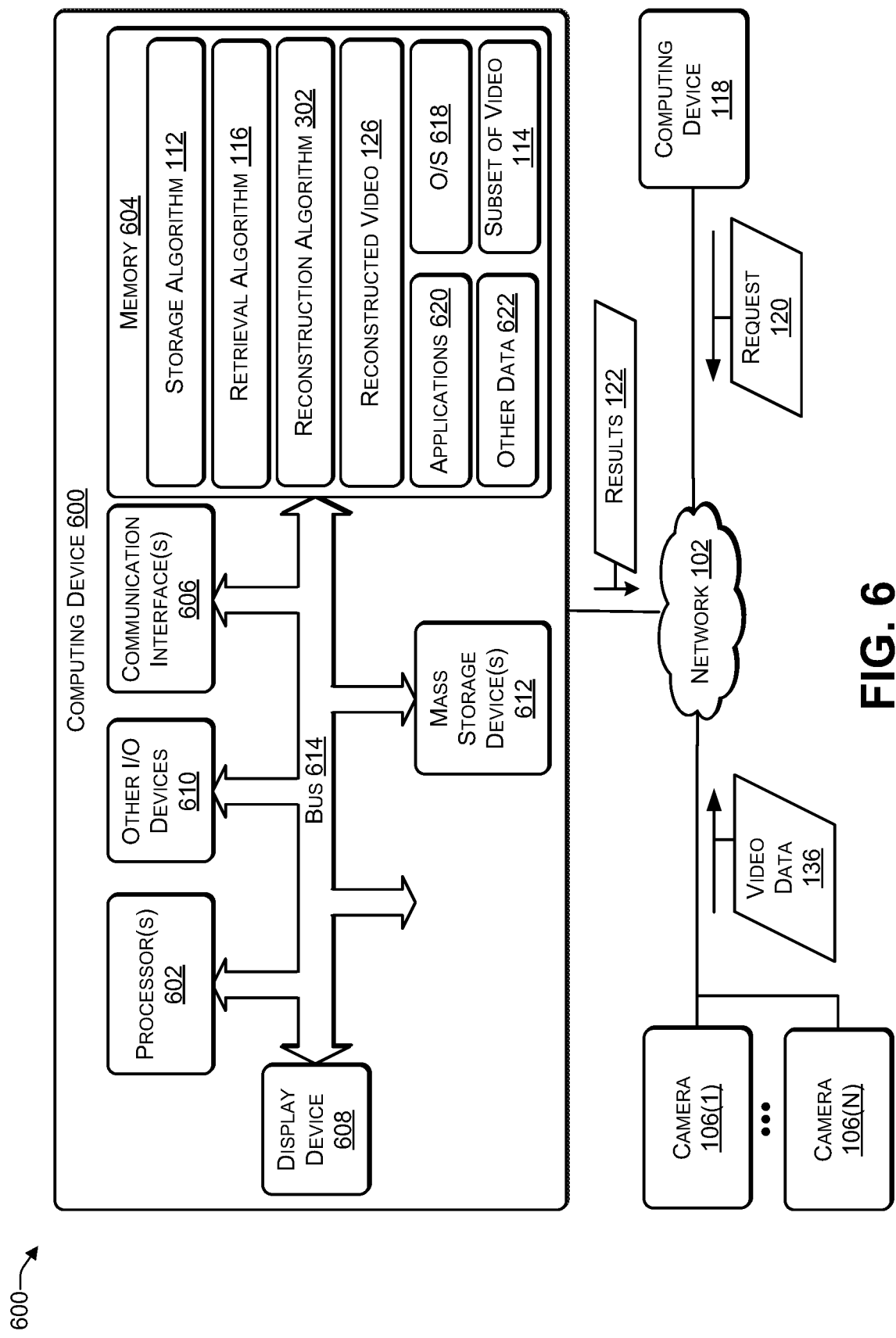
FIG. 6 illustrates an example configuration of a computing device that can be used to implement the systems and techniques described herein.

FIG. 6 illustrates an example configuration of a computing device 600 that can be used to implement the systems and techniques described herein, such as for example, the system 100 of FIG. 1, the server 104 of FIG. 1, FIG. 2, FIG. 3, and the computing device 118. The computing device 600 may include one or more processors 602 (e.g., CPU, GPU, or the like), a memory 604, communication interfaces 606, a display device 608, other input/output (I/O) devices 610 (e.g., keyboard, trackball, and the like), and one or more mass storage devices 612 (e.g., disk drive, solid state disk drive, or the like), configured to communicate with each other, such as via one or more system buses 614 or other suitable connections. While a single system bus 614 is illustrated for ease of understanding, it should be understood that the system buses 614 may include multiple buses, such as a memory device bus, a storage device bus (e.g., serial ATA (SATA) and the like), data buses (e.g., universal serial bus (USB) and the like), video signal buses (e.g., Thunder-Bolt®, DVI, HDMI, and the like), power buses, etc.

The processors 602 are one or more hardware devices that may include a single processing unit or a number of processing units, all of which may include single or multiple computing units or multiple cores. The processors 602 may include a graphics processing unit (GPU) that is integrated into the CPU or the GPU may be a separate processor device from the CPU. The processors 602 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 602 may be configured to fetch and execute computer-readable instructions stored in the memory 604, mass storage devices 612, or other computer-readable media.

Memory 604 and mass storage devices 612 are examples of computer storage media (e.g., memory storage devices) for storing instructions that can be executed by the processors 602 to perform the various functions described herein. For example, memory 604 may include both volatile memory and non-volatile memory (e.g., RAM, ROM, or the like) devices. Further, mass storage devices 612 may include hard disk drives, solid-state drives, removable media, including external and removable drives, memory cards, flash memory, floppy disks, optical disks (e.g., CD, DVD), a storage array, a network attached storage, a storage area network, or the like. Both memory 604 and mass storage devices 612 may be collectively referred to as memory or computer storage media herein and may be any type of non-transitory media capable of storing computer-readable, processor-executable program instructions as computer program code that can be executed by the processors 602 as a particular machine configured for carrying out the operations and functions described in the implementations herein.

The computing device 600 may include one or more communication interfaces 606 for exchanging data via the network 102. The communication interfaces 606 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, ZigBee, cellular, satellite, etc.), the Internet and the like. Communication interfaces 606 can also provide communication with external storage, such as a storage array, network attached storage, storage area network, cloud storage, or the like.

The display device 608 may be used for displaying content (e.g., information and images) to users. Other I/O devices 610 may be devices that receive various inputs from a user and provide various outputs to the user, and may include a keyboard, a touchpad, a mouse, a printer, audio input/output devices, and so forth.

The computer storage media, such as memory 604 and mass storage devices 612, may be used to store software and data. For example, the computer storage media may be used to store storage algorithm 112, one or more subsets of video 114, retrieval algorithm 116, reconstruction algorithm 302, reconstructed video 126, an operating system 618, one or more software applications 620, and other data 622.

The computing device 600 may be communicatively coupled via the network 102 to one or more cameras 106(1), . . . , 106(N) and a computing device 118. The one or more cameras (106) (1), . . . , 106(N) transmit video data 136 to computing device 600 through network 102. Computing device 118 processes video data 136 using storage algorithm 112 and stores the processed video data 136 as subset of video 114. The computing device 118 may transmit a request 120 to computing device 600 where the request specifies a video segment captured by a particular camera, such as one or more cameras 106(1), . . . , 106(N). Request 120 includes data specifying a date, a start time, and a length of the requested video segment. Computing device 600 transmits results 122 in response to the request 120 where results 122 includes reconstructed video 126.

Thus the computing device 600 may be used in a security camera network, where multiple cameras may send video data to a central server for storage and subsequent retrieval. The video data may be sent in a format based on an MPEG-based (or similar) compression scheme, such as MPEG4, H.264, or the like. Because multiple video streams from multiple cameras can generate terabytes of data, a storage algorithm may further compress the video data before storage. A retrieval algorithm may reconstruct the video data during the retrieval process. For example, in some cases, odd numbered frames may be stored and the even numbered frames may be discarded, thereby reducing storage usage by 50%. The business or residential customer that has deployed the security camera network can use the 50% reduction in storage in several ways. First, the business or residential customer may store video for a longer period of time, e.g., 6 months rather than 3 months. Second, the business or residential customer may use a smaller storage device, thereby saving on the cost of purchasing a large storage device. Third, the business or residential customer may deploy additional cameras without having to purchase additional storage capacity. For example, as a business grows, the business may add more security cameras to the network without having to increase the storage capacity of the central storage device.

When a user requests retrieval of a particular video segment by specifying a camera (or set of cameras), a date, a start time, and a length (or an end time), the retrieval algorithm may identify and retrieve video data associated with the video segment. For example, the retrieval algorithm may identify the odd frames from the requested video segment that were stored in the storage device. The discarded frames (e.g., the even frames) may be regenerated using a machine learning technique, such as extreme learning machine. The regenerated (e.g., even) frames may be combined with the retrieved (e.g., odd) frames to create a reconstructed video segment that is provided to the requesting device. The user that requested the particular video segment may view the reconstructed video segment.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
    receiving a sequence of video frames for a video segment from a particular camera of a plurality of cameras;
    discarding every second video frame of the sequence to create a sub sequence of video frames;
    comparing adjacent video frames of the sub sequence;
    determining that the adjacent video frames differ from each other by less than a predetermined amount;
    discarding one of the adjacent video frames from the sub sequence to create an updated sub sequence;
    storing the updated subsequence in memory;
    receiving, by one or more processors, a request for the video segment, the request specifying a date, a start time, a time length of the video segment, and an identifier associated with the particular camera;
    selecting, based on one or more criteria, the updated subsequence stored in the memory in response to receiving the request;
    regenerating, by one or more processors executing a machine learning algorithm, the discarded every second video frame of the sequence and the discarded adjacent video frame based on the updated sub sequence of video frames to create regenerated video frames;
    merging, by one or more processors, the updated sub sequence of video frames with the regenerated video frames to create a reconstructed video segment; and
    providing, by one or more processors, the reconstructed video segment as the requested video segment.

2. The method of claim 1, wherein one of the discarded every second video frame is regenerated based on adjacent video frames of the sub sequene.

3. The method of claim 1, wherein the machine learning algorithm comprises an extreme learning algorithm.

4. The method of claim 1, wherein regeneration and reconstruction of each one minute portion of the reconstructed video segment takes three seconds or less.

5. The method of claim 1, wherein,
    wherein time stamps of the adjacent video frames are within a predetermined time period of each other.

6. A computing device comprising:
    one or more processors; and
    one or more non-transitory computer readable media storing instructions executable by the one or more processors to perform operations comprising:
    receiving a sequence of video frames for a video segment from a particular camera of a plurality of cameras;
    discarding every second video frame of the sequence to create a sub sequence of video frames;
    comparing adjacent video frames of the sub sequence;
    determining that the adjacent video frames differ from each other by less than a predetermined amount;
    discarding one of the adjacent video frames from the sub sequence to create an updated sub sequence;
    storing the updated subsequence in memory;
    receiving a request for the video, the request specifying a date, a start time, and a time length of the video segment, and an identifier associated with the particular camera;
    selecting, based on one or more criteria, the updated subsequence stored in the memory in response to receiving the request;
    regenerating the discarded every second video frame of the sequence and the discarded adjacent video frame based on the updated sub sequence of video frames to create regenerated video frames;
    reconstructing a reconstructed video segment by merging the updated sub sequence of video frames with the regenerated video frames; and
    providing the reconstructed video segment as the requested video segment.

7. The computing device of claim 6, wherein the machine learning algorithm comprises an extreme learning algorithm.

8. The computing device of claim 6,
    wherein time stamps of the adjacent video frames are within a predetermined time period of each other.

9. The computing device of claim 6, wherein the operation of regenerating and reconstructing of each one minute portion of the reconstructed video segments takes three seconds or less.

10. One or more non-transitory computer readable media storing instructions executable by one or more processors to perform operations comprising:
    receiving a sequence of video frames for a video segment from a particular camera of a plurality of cameras;
    discarding every second video frame of the sequence to create a sub sequence of video frames;
    comparing adjacent video frames of the sub sequence;
    determining that the adjacent video frames differ from each other by less than a predetermined amount;
    discarding one of the adjacent video frames from the sub sequence to create an updated sub sequence;

storing the updated subsequence in memory;

receiving a request for the video, the request specifying a date, a start time, and a time length of the video segment, and an identifier associated with the particular camera;

regenerating, by executing a machine learning algorithm, the discarded every second video frame of the sequence and the discarded adjacent video frame based on the updated sub sequence of video frames to create regenerated video frames;

reconstructing a reconstructed video segment by merging the updated sub sequence of video frames with the regenerated video frames; and providing the reconstructed video segment as the requested video segment.

11. The one or more non-transitory computer readable media of claim 10, wherein the machine learning algorithm comprises an extreme learning algorithm.

12. The one or more non-transitory computer readable media of claim 10, wherein time stamps of the adjacent frames are within a predetermined time period of each other.

13. The one or more non-transitory computer readable media of claim 10, wherein regeneration and reconstruction of each one minute portion of the reconstructed video segment takes three seconds or less.

* * * * *